(12) United States Patent
Cermak

(10) Patent No.: US 8,025,454 B2
(45) Date of Patent: Sep. 27, 2011

(54) CONNECTING ASSEMBLY BETWEEN A SHAFT JOURNAL AND A CONSTANT VELOCITY UNIVERSAL JOINT

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 348 days.

(21) Appl. No.: 12/371,283

(22) Filed: Feb. 13, 2009

(65) Prior Publication Data

US 2009/0208279 A1 Aug. 20, 2009

(30) Foreign Application Priority Data

Feb. 14, 2008 (DE) .................. 10 2008 009 362

(51) Int. Cl.
*B25G 3/18* (2006.01)
(52) U.S. Cl. ...................... 403/319; 403/359.5
(58) Field of Classification Search .......... 403/316, 403/319, 359.5, 377, DIG. 7; 464/182, 904–906
See application file for complete search history.

(56) References Cited

U.S. PATENT DOCUMENTS

| | | | | |
|---|---|---|---|---|
| 3,669,477 A * | 6/1972 | Ulich | ............. | 403/372 |
| 4,756,640 A * | 7/1988 | Gehrke | ............. | 403/326 |
| 4,813,808 A * | 3/1989 | Gehrke | ............. | 403/326 |
| 5,078,533 A * | 1/1992 | Madonio et al. | ............. | 403/288 |
| 5,290,203 A * | 3/1994 | Krude | ............. | 464/145 |
| 5,647,801 A * | 7/1997 | Jacob | ............. | 464/145 |
| 5,692,961 A * | 12/1997 | Turner | ............. | 464/146 |
| 5,807,180 A * | 9/1998 | Knodle et al. | ............. | 464/139 |
| 5,853,177 A * | 12/1998 | Brissette et al. | ............. | 277/551 |
| 6,264,568 B1 * | 7/2001 | Frazer et al. | ............. | 464/173 |
| 6,390,925 B1 | 5/2002 | Perrow | | |
| 6,840,865 B2 * | 1/2005 | Lentini et al. | ............. | 464/133 |
| 7,004,844 B2 * | 2/2006 | Fraher | ............. | 464/162 |
| 7,470,198 B2 * | 12/2008 | Cermak | ............. | 464/173 |
| 7,712,994 B2 * | 5/2010 | Cermak | ............. | 403/342 |
| 7,850,531 B2 * | 12/2010 | Brunetti et al. | ............. | 464/178 |
| 7,867,099 B2 * | 1/2011 | Szentmihalyi et al. | ....... | 464/182 |
| 7,896,749 B2 * | 3/2011 | Booker | ............. | 464/145 |
| 7,909,702 B2 * | 3/2011 | Nishio | ............. | 464/182 |
| 2001/0016520 A1 * | 8/2001 | Sahashi et al. | ............. | 464/182 |

(Continued)

FOREIGN PATENT DOCUMENTS

| | | |
|---|---|---|
| DE | 8030364 | 3/1981 |
| DE | 8912249 | 3/1991 |
| DE | 10020975 | 11/2001 |
| DE | 102004048079 A1 | 4/2006 |

(Continued)

OTHER PUBLICATIONS

English Translation of DE 10 2004 048 079 (5 pages).

*Primary Examiner* — Joshua Kennedy
(74) *Attorney, Agent, or Firm* — Rader, Fishman & Grauer PLLC

(57) ABSTRACT

A connecting assembly comprises a shaft journal with an outer journal groove; a constant velocity universal joint with an inner joint part which, for the purpose of transmitting torque, is connected to the shaft journal in a rotationally fixed way and which comprises a sleeve projection, wherein, in an outer circumferential face of the sleeve projection, there is provided an engagement recess; a securing sleeve for axially fixing the inner joint part relative to the shaft journal; wherein the securing sleeve comprises inner holding portions which engage the journal groove, as well as outer holding portions which engage the at least one engagement recess.

19 Claims, 4 Drawing Sheets

U.S. PATENT DOCUMENTS

| | | | |
|---|---|---|---|
| 2005/0192106 A1* | 9/2005 | Cermak | 464/145 |
| 2008/0188317 A1* | 8/2008 | Booker | 464/146 |
| 2008/0293500 A1* | 11/2008 | Hahn et al. | 464/146 |
| 2009/0317182 A1* | 12/2009 | Szentmihalyi | 403/298 |
| 2010/0239364 A1 | 9/2010 | Cermak | |

FOREIGN PATENT DOCUMENTS

| | | |
|---|---|---|
| DE | 102009016066 | * 10/2010 |
| EP | 0423468 | 4/1991 |
| EP | 1199488 | 4/2002 |
| WO | WO-0184003 | 11/2001 |

* cited by examiner

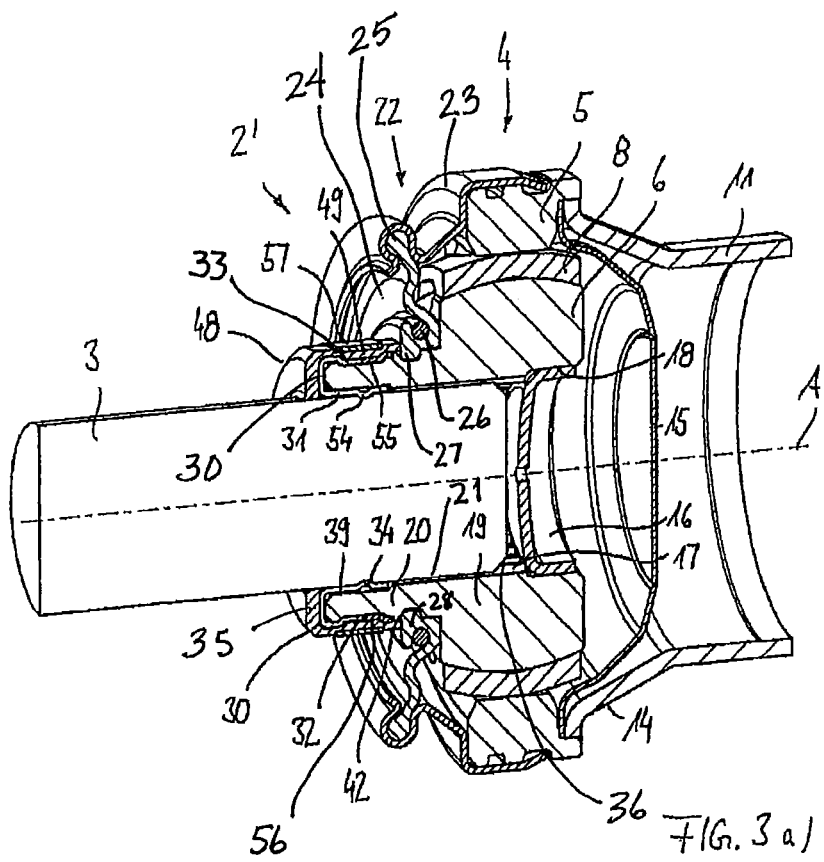
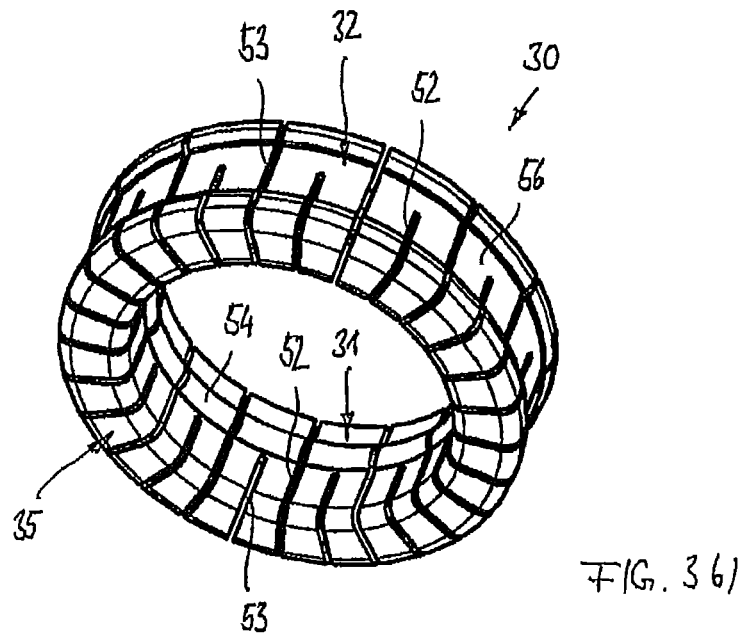

CONNECTING ASSEMBLY BETWEEN A SHAFT JOURNAL AND A CONSTANT VELOCITY UNIVERSAL JOINT

CROSS-REFERENCES TO RELATED APPLICATION

This application claims priority to German patent application DE 10 2008 009 362.9 filed Feb. 14, 2008, which is hereby incorporated by reference in its entirety.

BACKGROUND AND SUMMARY

The invention relates to a connecting assembly between a shaft journal and a constant velocity universal joint used, more particularly in the drive line of a motor vehicle. The constant velocity universal joint comprises an outer joint part connectable to a driveshaft, an inner joint part which is engaged by the shaft journal in a rotational fixed way for torque transmitting purposes, as well as torque transmitting elements which are effective between the outer joint part and the inner joint part. The shaft journal can be the input part or the output part of a drive, more particularly of an axle differential or of a transmission, so that the shaft journal is axially and radially fixed. Accordingly, the constant velocity universal joint can be positioned at one end of a propeller shaft. The shaft journal can also be radially elastically supported in an elastic intermediate bearing, with the constant velocity universal joint then being used as the central joint of a two-part propeller shaft.

From DE 10 2004 048 079 A1, there is known a connecting assembly between a constant velocity universal joint which is arranged at the end of the propeller shaft and an axially fixed shaft journal of a gearbox. By means of longitudinal teeth, the shaft journal engages an inner joint part of a constant velocity universal joint in a rotationally fixed way. The propeller shaft comprises a threaded portion on to which there is threaded a threaded sleeve. The threaded sleeve engages a threaded recess of the inner joint part, with a securing ring being arranged in the threaded recess axially fixing the inner joint part relative to the threaded sleeve.

U.S. Pat. No. 4,756,640 proposes a connecting assembly between the inner joint part of a constant velocity universal joint and a shaft journal, using a securing element. The securing element comprises a shoulder which is axially held in an outer annular groove of the shaft journal, as well as a plurality of longitudinally extending elastic fingers which engage an inner annular groove of the inner joint part.

Overall, connecting a constant velocity universal joint to a shaft journal is complicated because, there is available only a limited amount of space and the final assembly stage is also complicated. At the same time, the connecting assembly between the constant velocity universal joint and the shaft journal is subject to optimum safety regulations to prevent disconnection and to ensure minimum adverse effects on the strength of the components.

It is the object of the present invention to propose a connecting assembly between a constant velocity universal joint and a shaft journal, which has s compact design, which permits secure axial fixing conditions and ensures a minimum effect on the shaft strength, with easy assembly and dismantling procedures being ensured as well.

The objective is achieved by providing a connecting assembly, more particularly for use in the driveline of a motor vehicle, comprising a shaft journal with an outer journal groove; a constant velocity universal joint with an inner joint part which is connected to the shaft journal in a rotationally fixed way for transmitting torque, and which comprises a sleeve projection, wherein, in an outer circumferential face of the sleeve projection, there is provided at least one engagement recess; a securing sleeve for axially fixing the inner joint part relative to the shaft journal; wherein the securing sleeve comprises inner holding portions which engage the journal groove, as well as outer holding portions which engage the at least one engagement recess.

The advantage of the inventive connecting assembly is that there are achieved secure axial fixing conditions between the inner joint part and the shaft journal. By means of its sleeve projection, the inner joint part is inserted into the annular chamber formed between the inner holding portions and the outer holding portions of the securing sleeve. This design allows the depth of the journal groove to be minimised, as a result of which the strength of the shaft journal is maximised in the region of the journal groove because the inner holding portions are radially secured against being widened by the sleeve projection of the slid-in inner joint part. The shape of the journal groove can be correspondingly flat, so that the shaft journal experiences only a slight cross-sectional reduction. A further advantage refers to the simple construction of the connecting assembly which comprises only a few parts, which has an advantageous effect on production costs. The connecting assembly requires only a small space, and the components are easily mounted. More particularly, the constant velocity joint can be completely pre-assembled, so that, during the final assembly stage, only the connection with the shaft journal has to be effected.

More particularly, the shaft journal can be the input part or the output part of a drive. If provided in the form of an input part, the shaft journal can be used for example in an axle differential which serves to distribute the introduced torque from the propeller shaft to two sideshafts. If provided in the form of an output part, the shaft journal can be used in a transmission from which the torque is introduced into the propeller shaft. The drive is fitted prior to the driveshaft being mounted, so that the shaft journal is axially and radially fixed in the drive housing.

For mounting purposes, the securing sleeve is slid on to the shaft journal far enough to allow the elastic inner holding portions to engage the journal groove. Then the inner joint part and thus the entire constant velocity universal joint is slid on to the shaft journal until the elastic outer holding portions engage the at least one engagement recess of the sleeve projection. In the slid-in condition, the sleeve projection, by means of its end portion, is arranged radially between the inner and outer holding portions of the securing sleeve. In this way the inner holding portions are prevented from widening radially, so that they are securely held in the journal groove. If viewed in half a longitudinal section, the securing sleeve preferably comprises an approximately C-shaped profile; to that extent, the securing sleeve can also be regarded as an envelope sleeve, with the inner joint part, by means of its sleeve projection being inserted into the annular chamber formed between the inner sleeve portion and the outer sleeve portion. The inner sleeve portion and the outer sleeve portion have a substantially cylindrical shape.

According to a preferred embodiment, there is provided a collar member which is slipped on to the securing sleeve and secures the outer holding portions against radial widening, with the collar member covering part of the sleeve projections of the inner joint part, including the securing sleeve. In its mounted condition, the collar member thus prevents the outer holding portions of the securing sleeve from being elastically bent open or widened radially outwardly, so that the connecting assembly is reliably secured even at high speeds and related centrifugal forces. For fixing the collar member, there can be provided a binding element or a securing ring, with the binding element preferably being designed in such a way that it cannot be closed unless the collar is accurately positioned on the sleeve projection. In this way, secure assembly conditions are ensured.

According to further preferred embodiment, the securing sleeve comprises a radial portion which connects the inner holding portions to the outer holding portions. The radial portion can be provided in the form of a continuous ring or it can comprise radial partial portions which are indirectly connected to one another. The securing sleeve is preferably shaped in such a way that the axial projection of the inner joint part, in the mounted condition, extends as far as the radial portion of the securing sleeve, more particularly, that it can be made to contact same. The radial portion of the securing sleeve thus functions as a stop if axial forces occur between the inner joint part and the shaft journal. The securing sleeve is preferably produced out of plate metal as a formed part. This is advantageous because the securing sleeve can then be produced in a simple way, for example by being turned over out of a circular blank or out of a meander-shaped strip material which is formed into a ring and subsequently welded, or it remains open. Using plate metal is advantageous in that the individual partial portions of the securing sleeve can be flat so that there is required only a small amount of installation space. However, different materials and production methods are also conceivable, such as producing the securing sleeve out of plastics.

According to a first design of the securing sleeve, the inner holding portions are provided in the form of elastic holding fingers which are circumferentially distributed and project from the radial portion in the longitudinal direction. The holding fingers preferably comprise radially inwardly directed engagement projections which are located more particularly at the end of the holding fingers and engage the journal groove. In this way, the inner joint part is axially secured relative to the shaft journal. The outer holding portions preferably comprise elastic holding tongues which engage the at least one engagement recess of the inner joint part. In a concrete embodiment, the outer holding portions each comprise two longitudinally extending side webs and one connecting web connecting same to one another, wherein the elastic holding tongues projecting inwardly from the connecting webs. Thus the circumferentially extending radial portion, the longitudinally extending side webs and the circumferentially extending connecting web form a frame around an aperture into which there extends the holding tongue. The holding tongues are slightly bent inwardly from the connecting web and, by means of their free ends, extend towards the radial portion of the securing sleeve. All the holding tongues engage the engagement recess which is preferably provided in the form of a continuous annular groove. If viewed in a longitudinal section, the profile of the annular groove is approximately adapted to the shape of the holding tongues, with the depth of the annular groove increasing more particularly towards the end of the sleeve projection.

According to a second design, the inner holding portions of the securing sleeve are provided in the form of circumferentially distributed inner holding tongues which extend in the longitudinal direction. The inner holding tongues preferably comprise inwardly directed first projections which engage the journal groove to provide axial security. In half a longitudinal section, the first projections can be provided in the form of bulging portions, preferably arch-shaped bulging portions, with the journal groove then preferably comprising a round or oval profile. The groove depth and the notch effect can thus be minimised, which has a positive effect on the strength of the shaft journal. Accordingly, the outer holding portions are preferably provided in the form of circumferentially distributed outer holding tongues which extend in the longitudinal direction. The outer holding tongues comprise inwardly directed second projections which engage the at least one recess of the sleeve projection to provide axially secured conditions. According to a preferred embodiment, the securing sleeve, in a developed view, is meander-like, with one inner holding tongue following to adjoining outer holding tongues and, accordingly, with one outer holding tongue following two adjoining inner holding tongues. This is achieved in that between each two adjoining outer and inner holding tongues, there are provided longitudinal slots, with the outer longitudinal slots extending into the opposed inner holding tongue and with the inner longitudinal slots extending into the opposed outer holding tongue. In this way, it is possible to achieve an elastic spring effect of the securing ring.

For both designs it is advantageous if the sleeve projection of the inner joint part comprises an inner recess with a preferably cylindrical inner face which delimits a receiving chamber for the inner holding portions of the securing sleeve. The inner holding portions are clamped in between the outer face of the shaft journal and the inner face of the sleeve projection. The inner holding portions are thus prevented from being radially bent open, which could be caused by centrifugal forces or radial forces induced by axial forces, so that the holding portions are securely fixed in the journal groove. At its end, the sleeve projection comprises preferably conical flattened portions in order to permit an easy assembly procedure by inserting the sleeve projection into the securing sleeve. At its outer circumferential face, the sleeve projection preferably comprises a radial projection up to which the outer holding portions, by means of their free ends, approximately extend in the mounted condition of the assembly. The radial projection which can be provided in the form of an annular bead thus forms an axial stop for the securing sleeve. To ensure sealing conditions, it is advantageous if the inner joint part, at its sleeve projection, comprises a continuous annular groove which can be engaged by the inner bead of a sealing member.

The rotationally fixed connection between the inner joint part and the shaft journal is preferably provided in form of a splined connection, other torque-proof connections not being excluded. This applies to all the above-mentioned embodiments. It is proposed that the journal groove which is engaged by the securing sleeve by means of its inner holding portions is arranged so as to axially adjoin the shaft splines. The annular groove is thus easy to produce because it is not positioned inside the shaft splines. The inner joint part comprises a ball track portion in which there are formed inner ball tracks, with the shaft splines axially extending beyond the ball track portion as far as and into sleeve projection. This measure allows the transmission of particularly high torque values.

BRIEF SUMMARY OF THE DRAWINGS

Preferred embodiments of the invention will be described below with reference to the drawings wherein.

Figure 1A:
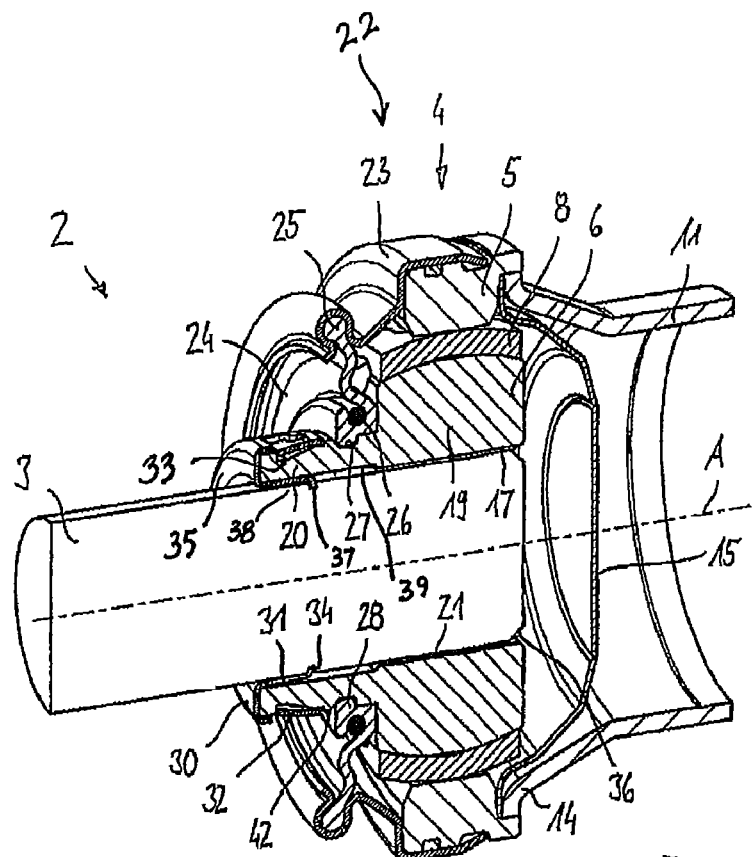
FIG. 1 shows an inventive connecting assembly between a shaft journal and a constant velocity universal joint in a first embodiment
 a) in a longitudinal section in a perspective view;
 b) in the connecting region according to FIG. 1a) in the form of a detail.

c) the securing sleeve according to FIG. 1a) in the form of a detail in a perspective view.

Figure 1B:
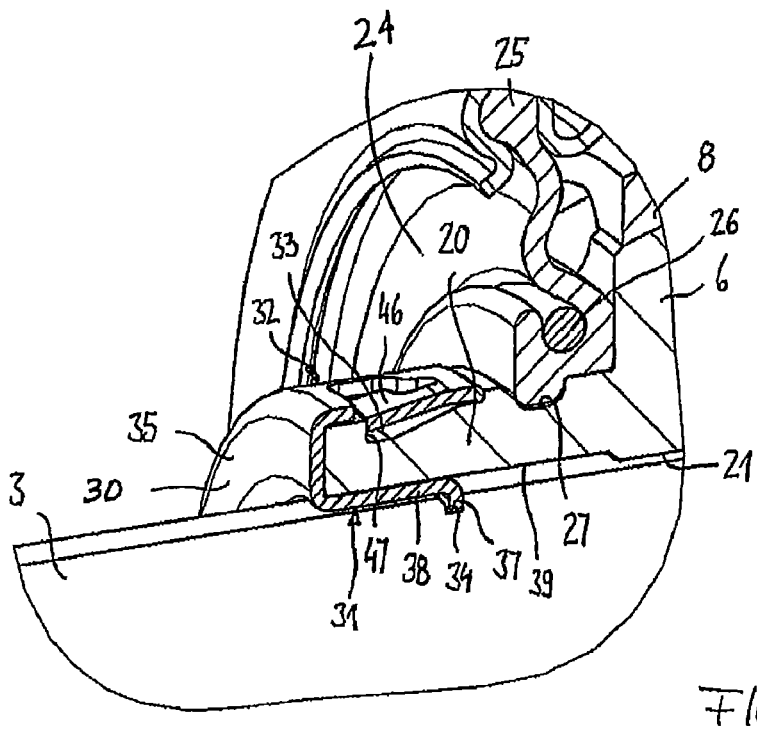
Figure 1C:
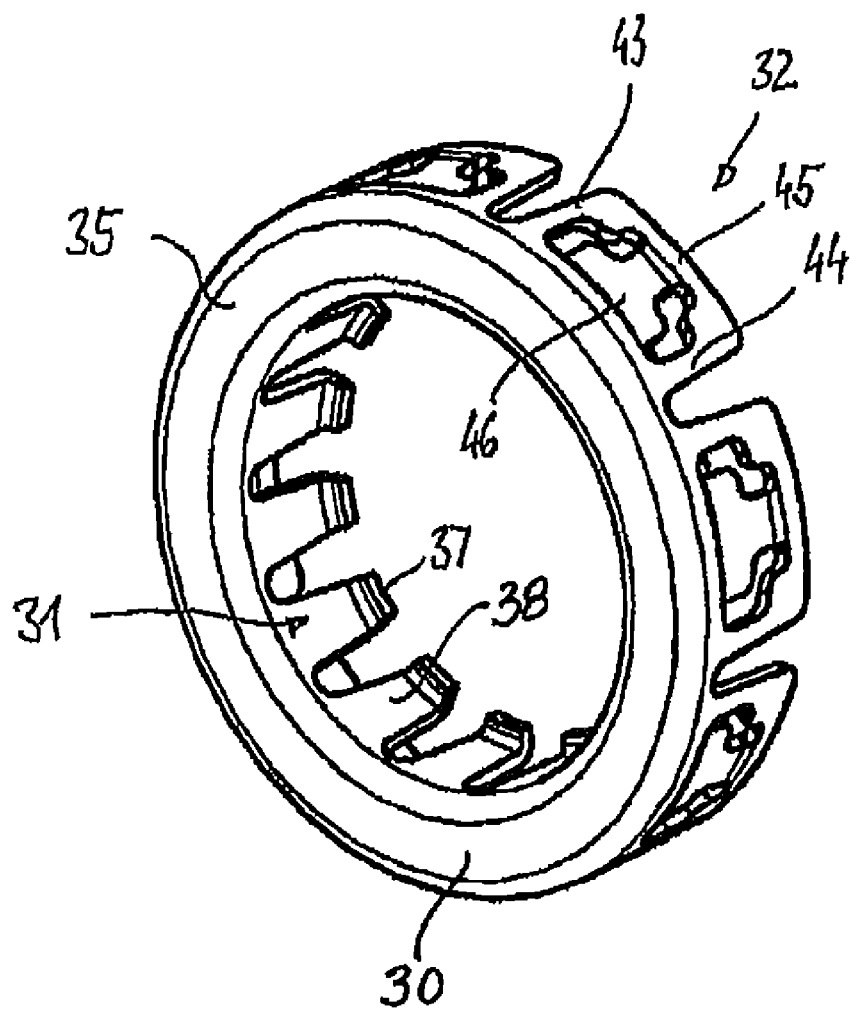
Figure 2A:
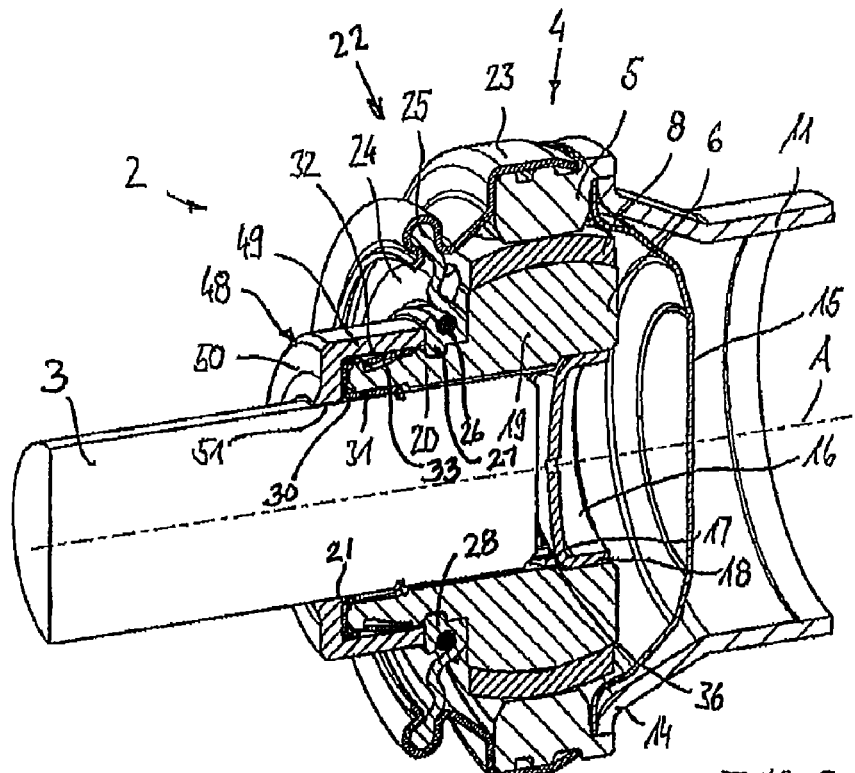

FIG. 2 shows the connecting assembly according to FIG. 1 with a slid-on collar member
  a) in a longitudinal section in a perspective view;
  b) the connecting region according to FIG. 2a) in the form of a detail.

FIG. 3 shows an inventive connecting assembly between a shaft journal and a constant velocity universal joint in a further embodiment
  a) in a longitudinal section in a perspective view;
  b) the securing sleeve according to FIG. 3a) in the form of a detail in a perspective view.

DETAILED DESCRIPTION OF THE PREFERRED EMBODIMENTS

FIGS. 1 to 3 will initially be described jointly below to the extent they comprise details corresponding to one another. A shaft journal 3 is connected to a constant velocity universal joint 4 in a way yet to be described in greater detail. The shaft journal 3 can be the input part or the output part of a drive, for example of an axle differential or a transmission of a motor vehicle. In such a case, the constant velocity universal joint 4 is arranged at one end of the propeller shaft, with the shaft journal 3 being rotatably supported and axially fixed in a drive housing. The shaft journal 3 can also be the end piece of a driveshaft, with the constant velocity universal joint then acting as the central joint of a multi-part driveshaft.

The constant velocity universal joint 4 comprises an outer joint part 5, an inner joint part 6, torque transmitting balls and a ball cage 8. In the illustrations shown, the balls are located in a different sectional plane and are therefore not visible in the present case. The outer joint part 5 comprises outer ball tracks which are distributed around the circumference, and the inner joint part 6, accordingly, comprises inner ball tracks. One outer ball track and one inner ball track, together, form a pair of ball tracks in which, for torque transmitting purposes, there is guided a ball. A hollow shaft 11 is welded to the outer joint part 5. The hollow shaft 11 comprises a shaft tube with a flange part 14 at its end. Between the flange part 14 and the outer joint part 5, there is inserted a cover 15 which seals the joint chamber towards the shaft tube. It goes without saying that the constant velocity universal joint 4 can be any type of CV joint.

At its end opposite the hollow shaft 11, the constant velocity universal joint 4 is sealed by a sealing assembly 22. The sealing assembly 22 comprises a holding element 23 which is fixed to the outer joint part 5, more particularly clipped on, as well as a sealing member 24 which, by means of an outer continuous bead 25, sealingly engages a beaded end of the holding ring 23. On its radial inside, the sealing member 24, which is preferably provided in the form of a diaphragm boot, comprises an inner collar 28 which engages a corresponding annular groove 27 of the inner joint part 6. For fixing the inner collar 28 on the inner joint part 6, there is provided a securing ring 26 which engages a corresponding annular recess on the outside of the collar 28. The inner joint part 6 comprises a ball track portion 19 which extends approximately along the length of the inner ball tracks 10, 13, as well as an axially adjoining sleeve projection 20 which is preferably produced so as to be integral with the portion 19. The continuous annular groove 27 for fixing the diaphragm boot 24 is arranged in the sleeve projection 20 so as to axially adjoin the ball track portion 19. Furthermore, the inner joint part 6 comprises a central through-bore 21 with inner shaft splines 17 into which there is inserted the shaft journal 3 with matching outer shaft splines to permit the transmission of torque.

At its end facing the joint 4, the shaft journal 3 comprises an outer conical face 36 for being introduced into the bore 21 of the inner joint part 6. For axially securing the shaft journal 3 relative to the inner joint part 6, there is provided a securing sleeve 30 which is provided approximately in the form of a enveloping sleeve and which, if viewed in half a longitudinal section, comprises an approximately C-shaped profile. The securing sleeve 30, by means of inner holding portions 31, engages a continuous outer annular groove 34 of the shaft journal 3 and which, by means of outer holding portions 32, engages a continuous outer annular groove 33 of the inner joint part 6. The inner joint part 6 is thus axially secured relative to the shaft journal 3. The securing sleeve 30 can be produced for example from plate metal as a formed part.

For assembly purposes, the securing sleeve 30 is slid on to the shaft journal 3 far enough to enable the elastic inner holding portions 31 to snap into the journal groove 34. Then the inner joint part 6 and thus the entire constant velocity universal joint 4, is slid on to the shaft journal 3 far enough to allow the elastic outer holding portions 32 to engage the outer engagement recess 33 of the sleeve projection 20. The engagement recess 33 is provided in the form of an annular groove. In the slid-in condition, the sleeve projection 20, by means of its end portion, is radially positioned between the inner and outer holding portions 31, 32 of the securing sleeve 30. The inner holding portions 31 are prevented from radially widening or being bent open, so that they are securely held in the journal groove 34.

Below, there will follow a description of the special features of the different embodiments as regards the connection between the shaft journal 3 and the inner joint part 6.

In the embodiment according to FIG. 1 (FIGS. 1a to 1c), the inner holding portions 31 of the securing sleeve 30 comprise elastic holding fingers 38. The holding fingers 38 are uniformly distributed around the circumference and project in the longitudinal direction from a radial portion 35 of the securing sleeve 30, i.e. approximately parallel to the axis of rotation A. The radial portion 35 of the securing sleeve is substantially annular-disk-shaped. The holding fingers 38 are provided approximately in the form of hollow cylindrical portions which, in the circumferential direction, extend over a clearly longer distance than in the radial direction. The concave inner faces of the holding fingers 38 are located on a circle whose diameter approximately corresponds to the outer diameter of the shaft journal 3 in the region adjoining the shaft groove 34. At their ends, the holding fingers 38 comprise radially inwardly directed engagements projections 37 which engage the journal groove 34. At its end portion, the sleeve projection 20 comprises an inner bore 39 which forms an annular recess with an approximately cylindrical inner face. Between the inner face of the sleeve projection 20 and the outer face of the shaft journal 3, there is formed an oblong annular chamber in which there are received the inner holding portions 31 of the securing sleeve 30. The diameter formed by the convex outer face of the holding fingers 38 approximately corresponds to the inner diameter of the bore 39 of the sleeve projection 20. In this way, the holding portions 31 are radially fixed, thus preventing any radial widening or bending-open due to centrifugal forces. The engagement projections 37 are securely held in the journal groove 34, so that the shaft journal 3 is reliably axially secured in the inner joint part 6.

The outer holding portions 32 each comprise two longitudinally extending side webs 43, 44 and a connecting web 45 which connects same and from which there is bent inwardly an elastic holding tongue 46 which extends at an angle relative to the axis of rotation A. Thus, the circumferentially extending annular portion, the longitudinally extending side webs 43, 44 and the circumferentially extending connecting web 45 form a frame around the aperture into which the holding tongue elastically projects. The holding tongues 46 engage an annular engagement recess 33 of the inner joint part 6, so that the inner joint part 6 is axially secured relative to the securing sleeve 30 and thus relative to the shaft journal 3. The depth of the engagement recess 33 provided in the form of an annular groove increases towards the free end of the sleeve projection 20. The annular groove 33 along its sides is delimited by a continuous radial side wall 47 which forms a stop face for the holding tongues 46. It can be seen that the elastic holding tongues 46 are formed on to the axial end of the outer holding webs 32 which faces the joint 4, with the free ends of the holding tongues 46 extending towards the radial portion 35 of the securing sleeve 30. With axial forces between the joint 4 and the shaft journal 3 extending away from one another, the holding tongues 46, by means of their ends, abut the side wall 47 of the annular groove 33. If the axial forces between the joint 4 and the shaft journal 3 are directed towards each other, the connecting webs 45 abut a continuous annular bead 42 of the sleeve projection 20. As a result of said measures, the joint 4 and the shaft journal 3 are axially secured relative to one another in both directions.

Figure 2B:
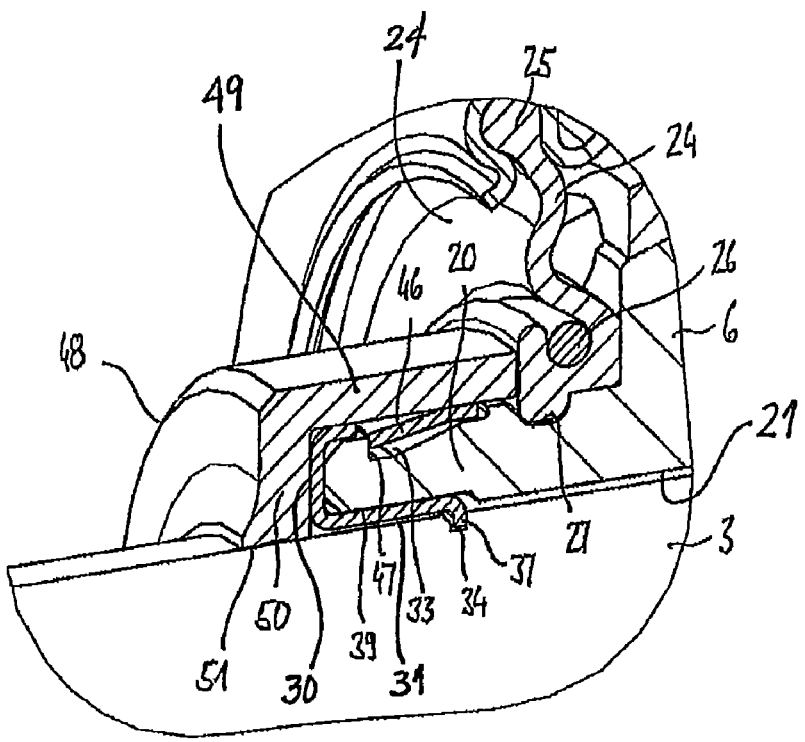

The embodiment shown in FIG. 2 (FIGS. 2*a* and 2*b*) largely corresponds to that according to FIG. 1, so that reference can be made to the above description. Corresponding components have been given the same reference numbers. In the present embodiment, a collar member 48 has been provided as an additional securing element, which collar member 48 is slid on to the end portion of the sleeve projection 20 and the securing sleeve 30 respectively. The collar member 48 comprises a sleeve portion 49 which axially covers the securing sleeve 30, thus preventing the outer holding portions 32 and the holding tongues 46 from being undesirably elastically bent open or widened. The collar member 48 also comprises a base portion 50 which radially covers the end face of the sleeve projection 20. The base portion 50 comprises a central aperture 51 which is penetrated by the shaft journal 3. The collar member 48 can be fixed relative to the shaft journal 3 in a form-fitting and positive way by snap lugs for the axial securing ring or by prior art securing means, for example a clamping band or a securing ring. In the present embodiment, the central through-bore 21 of the inner joint part 6, in an end portion facing the hollow shaft 11, comprises a radially widened bore portion 18 into which there is inserted a further cover 16 for sealing the joint chamber.

FIG. 3 shows a further inventive connecting assembly which, in respect of design, largely corresponds to that illustrated in FIG. 2. To that extent, reference is made to the above description and also to the description of FIG. 1. Corresponding components have been given the same reference numbers and the reference numbers of modified components have been provided with an apostrophe. In the present embodiment, the inner and outer holding portions 31, 32 have been provided in the form of holding tongues which are uniformly circumferentially distributed and which extend in the longitudinal direction, i.e. parallel to the axis of rotation A. The inner holding tongues 31 are separated from one another by longitudinal slots 52 which extend along the axial length of the inner holding tongues 31 and along the radial extension of the radial portion 35 as far as and into the outer holding portions 32. The outer holding tongues 32 are separated from one another by longitudinal slots 53 which extend along the axial length of the outer holding tongues 32 and the radial extension of the radial portion 35 as far as and into the inner holding portions 31. The outer and inner longitudinal slots 52, 53 alternate around the circumference, so that, overall, there is obtained a meander-like construction of the securing sleeve 30. In this way, the securing sleeve 30 achieves its elasticity, so that it is able to radially widen slightly to be able to be slid on to the shaft journal 3.

Altogether, the inner holding tongues 31 form a kind of inner sleeve for being slid on to the shaft journal 3. The inner holding tongues 31 each comprise radially inwardly directed first projections 54 which, for the purpose of providing axial security, engage the journal groove 34. If viewed in half a longitudinal section, the projections 54 are provided in the form of preferably arch-shaped bulging portions which engage the correspondingly formed journal groove 34, i.e. the journal groove 34, in a sectional view, comprises a round or oval profile with, more particularly, rounded edges. By means of this design, the groove depth and the cross-sectional weakening of the shaft journal 3 can be minimised, which has a positive effect on strength and service life. However, in principle, other groove profiles of the journal groove are also conceivable; for example they can be trapezoidal or rectangular.

The outer holding tongues comprise inwardly directed second projections 55 which, for the purpose of providing axial security, engage the annular outer recess 33 of the sleeve projection 20. If viewed in a longitudinal section, the second projections 55 are adapted to the profile of the recess 33; more particularly, the annular recess 33 comprises an approximately trough-shaped profile. There is thus formed an approximately cylindrical base which is radially inwardly set back relative to the annular bead 42 and the free end of the sleeve projection 20. As a result of this design, the outer faces of the second projections 55, overall, form an annular groove 56. A binding element 57 can engage the groove 56 for the purpose of axially securing the collar member 48. The binding element 57 thus fulfils a double function. On the one hand, the binding element 57 fixes the collar member 48 on the securing sleeve 30; on the other hand, the binding element 57 prevents the securing sleeve 30 from being elastically widened, for instance as a result of centrifugal forces, so that the inner joint part 6 is reliably axially secured relative to the shaft journal 3. It is conceivable for the collar member to be produced so as to be integral with the sealing member 24, which, however, has not been separately illustrated.

The sequence of the assembly procedure is as follows: sliding the securing sleeve 30 on to the shaft journal 3 until the inner projections 54 engage the journal groove 34; inserting the inner joint part 6 with its sleeve projection 20 into the annular chamber of the securing sleeve 30; sliding the collar member 48 back on to the sleeve projection 20; securing the collar member 48 by means of a binding element 57. If required, the connecting assembly 2 can be easily dismantled by releasing the binding element 57 and pulling off the inner joint part 6.

The above-described connecting assemblies 2 have the advantage of providing a particularly reliable and easily constructed axial connection between the inner joint part 6 and the shaft journal 3. Because the inner holding portions 31 of the securing sleeve 30 are secured by the inner face 39 of the sleeve projection 20 against being radially widened or bent open, the journal groove 34 can comprise a minimum depth and an advantageous, more particularly rounded contour. This has an advantageous effect on the strength of the shaft journal 3 because cross-sectional weakening and notch effect are reduced to a minimum. Furthermore, only a small number of parts is required for achieving axially secured conditions.

Prior to being slid on to the shaft journal 3, the constant velocity universal joint 4 is fully pre-assembled, which simplifies the final assembly stage.

The invention claimed is:

1. A connecting assembly, comprising:
a shaft journal with an outer journal groove;
a constant velocity universal joint with an inner joint part which is connected to the shaft journal in a rotationally fixed way for transmitting torque, and which comprises a sleeve projection, wherein, in an outer circumferential face of the sleeve projection, there is provided at least one engagement recess; and
a securing sleeve for axially fixing the inner joint part relative to the shaft journal;
wherein the securing sleeve comprises inner holding portions which engage the journal groove, as well as outer holding portions which engage the at least one engagement recess; and
further wherein the sleeve projection of the inner joint part is slid into an annular chamber formed between the inner holding portions and the outer holding portions of the securing sleeve.

2. A connecting assembly according to claim 1, further comprising a collar member which is slipped on to the securing sleeve and which secures the outer holding portions against being radially widened.

3. A connecting assembly according to claim 1, wherein the securing sleeve comprises a radial portion which connects the inner holding portions to the outer holding portions.

4. A connecting assembly according to claim 3, wherein, in a mounted condition, the sleeve projection of the inner joint part extends approximately as far as the radial portion of the securing sleeve, such that the inner joint part can be made to contact same.

5. A connecting assembly according to claim 3, wherein the inner holding portions are provided in the form of elastic holding fingers which are circumferentially distributed and project from the radial portion in the longitudinal direction.

6. A connecting assembly according to claim 5, wherein the elastic holding fingers comprise radially inwardly directed engagement projections which engage the journal groove.

7. A connecting assembly according to claim 1, wherein the outer holding portions comprise elastic holding tongues which engage the at least one engagement recess of the inner joint part.

8. A connecting assembly according to claim 7, wherein the outer holding portions each comprise longitudinally extending side webs and a connecting web connecting same to one another, wherein the elastic holding tongues inwardly project from the connecting webs.

9. A connecting assembly according to claim 1, wherein the inner holding portions are provided in the form of circumferentially distributed inner holding tongues which extend in the longitudinal direction.

10. A connecting assembly according to claim 9, wherein the inner holding tongues comprise inwardly directed first projections which engage the journal groove.

11. A connecting assembly according to claim 9, wherein a longitudinal slot is formed between two circumferentially adjoining inner holding tongues.

12. A connecting assembly according to claim 9, where in a developed view, the securing sleeve is meander-shaped, wherein one inner holding tongue is attached to two outer holding tongues, and wherein one outer holding tongue is attached to two inner holding tongues.

13. A connecting assembly according to claim 1, wherein the outer holding portions are provided in the form of circumferentially distributed outer holding tongues which extend in the longitudinal direction.

14. A connecting assembly according to claim 13, wherein the outer holding tongues comprise inwardly directed second projections which engage the at least one engagement recess of the sleeve projection.

15. A connecting assembly according to claim 13, further including a longitudinal slot formed between each two circumferentially adjoining outer holding tongues.

16. A connecting assembly according to claim 1, wherein the sleeve projection of the inner joint part comprises an inner recess with an inner face, wherein the inner holding portions of the securing sleeve are received between an outer face of the shaft journal and the inner face of the sleeve projection.

17. A connecting assembly according to claim 1, wherein the sleeve projection comprises a radial projection, wherein, in a mounted condition of the connecting assembly, free ends of the outer holding portions extend axially approximately as far as the radial projection.

18. A connecting assembly, comprising:
a shaft journal with an outer journal groove;
a constant velocity universal joint with an inner joint part which is connected to the shaft journal in a rotationally fixed way for transmitting torque, and which comprises a sleeve projection, wherein, in an outer circumferential face of the sleeve projection, there is provided at least one engagement recess;
a securing sleeve for axially fixing the inner joint part relative to the shaft journal, wherein the securing sleeve comprises inner holding portions which engage the journal groove, as well as outer holding portions which engage the at least one engagement recess; and
a collar member which is slipped on to the securing sleeve and which secures the outer holding portions against being radially widened.

19. A connecting assembly, comprising:
a shaft journal with an outer journal groove;
a constant velocity universal joint with an inner joint part which is connected to the shaft journal in a rotationally fixed way for transmitting torque, and which comprises a sleeve projection, wherein, in an outer circumferential face of the sleeve projection, there is provided at least one engagement recess; and
a securing sleeve for axially fixing the inner joint part relative to the shaft journal;
wherein the securing sleeve comprises inner holding portions which engage the journal groove, as well as outer holding portions which engage the at least one engagement recess;
and further wherein the sleeve projection of the inner joint part comprises an inner recess with an inner face, wherein the inner holding portions of the securing sleeve are received between an outer face of the shaft journal and the inner face of the sleeve projection.

* * * * *